April 25, 1944.  G. WHITE  2,347,382
APPARATUS FOR MANUFACTURING BENT, TEMPERED SHEETS OF GLASS
Filed April 10, 1939  2 Sheets-Sheet 2

Inventor
GERALD WHITE.
By Frank Fraser
Attorney

Patented Apr. 25, 1944

2,347,382

UNITED STATES PATENT OFFICE 2,347,382

APPARATUS FOR MANUFACTURING BENT, TEMPERED SHEETS OF GLASS

Gerald White, Toledo, Ohio, assignor to Libbey-Owens-Ford Glass Company, Toledo, Ohio, a corporation of Ohio Application April 10, 1939, Serial No. 267,001

4 Claims. (Cl. 49—1)

The present invention relates to an improved apparatus for the manufacture of bent, tempered sheets of glass.

In the tempering of flat sheets of glass according to one process well known to the art, the sheets are first heated to approximately the point of softening of the glass and then rapidly cooled to place the outer surfaces of said sheets under compression and the interiors thereof under tension. The glass sheets are heated to the proper temperature in a suitable furnace, and upon removal therefrom are subjected immediately to the action of suitable cooling means by which the glass is suddenly chilled. The cooling means usually employed comprises spaced blower heads between which the highly heated glass sheets are received; said blower heads being provided with a plurality of outlets which serve to direct jets or blasts of cooling air upon opposite surfaces of the sheets simultaneously. Ordinarily, the glass sheets are maintained in a vertical position during the treatment thereof, and it is customary to suspend the sheets from a plurality of relatively small hooks or tongs engaging the same near their upper edges. This tempering operation not only greatly increases the mechanical strength of the glass but also creates therein properties which make it highly desirable for certain installations.

It is the aim of this invention to produce curved or bent sheets of tempered glass according to the above process and has for its primary object the provision of apparatus for bending and tempering a plurality of sheets simultaneously.

Another object of the invention is the provision of such apparatus whereby a plurality of flat sheets of glass can be simultaneously heated and bent to an accurate predetermined curvature while suspended in a vertical position, and then rapidly cooled to temper the same without changing or shifting the position of the sheets between the bending and cooling operations, whereby to reduce the amount of handling of the glass and the chances of injury thereto to a minimum.

Briefly stated, in carrying out the invention, a plurality of flat sheets of glass to be bent and tempered are supported in a vertical position in spaced parallel relation and heated in a suitable furnace to a temperature approximating the softening point of the glass. When properly heated, the glass sheets are transferred from the furnace into position for bending and cooling. To effect the bending of the sheets, a plurality of pairs of bending members are moved between the sheets and actuated to effect the simultaneous bending thereof to the desired curvature. The bending members are then removed from between the bent sheets and a plurality of pairs of cooling members inserted between said sheets and operated to effect the sudden cooling thereof simultaneously to temper the same. The bending members and cooling members are successively brought into position between the glass sheets while said sheets are vertically supported and maintained in the same position.

Other objects and advantages of the invention will become more apparent during the course of the following description, when taken in connection with the accompanying drawings.

In the drawings, wherein like numerals are employed to designate like parts throughout the same:

Figure 1:
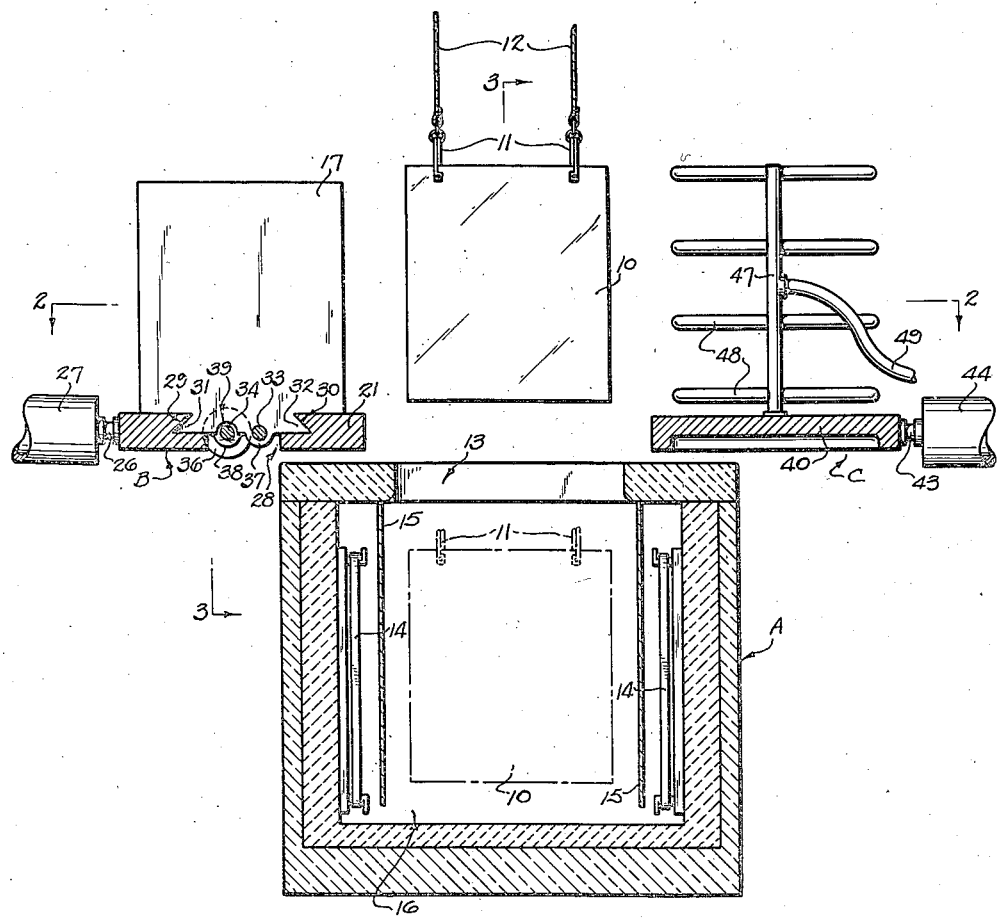
Fig. 1 is a vertical longitudinal section through bending and tempering apparatus constructed in accordance with the invention.

In the embodiment illustrated in the drawings, the means for heating the glass sheets comprises a furnace designated in its entirety by the letter A, the means for bending the glass sheets being designated generally by the letter B, and the means for subsequently chilling or cooling the sheets being designated C. The bending means B and cooling means C are here shown as being arranged above the furnace A and in horizontally spaced relation so that the glass sheets 10, after being heated within the furnace, can be lifted upwardly into a position between said bending means and cooling means as shown in Fig. 1, in which position the said sheets are adapted to be bent and cooled.

Figure 3:
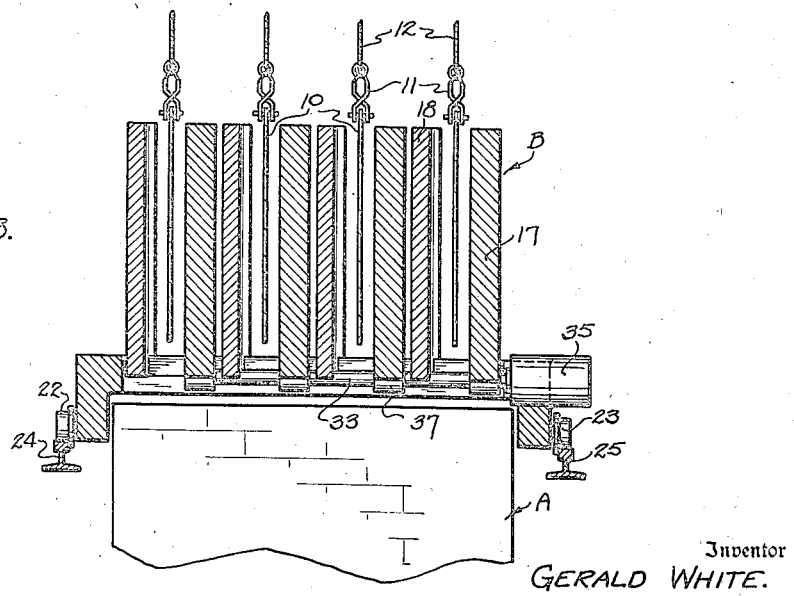
Fig. 3 is a vertical transverse section through the bending apparatus taken substantially on line 3—3 of Fig. 1.

A plurality of glass sheets 10 are vertically suspended side by side in spaced parallel relation, as shown in Fig. 3, with each sheet being carried by a pair of relatively small hooks or tongs 11 engaging opposite surfaces of the sheet near its upper edge. The hooks or tongs 11 may be attached to any suitable supporting and/or lifting means such as cables 12.

The furnace A is preferably of the electrically heated type and is formed with a top opening 13 through which the glass sheets 10 to be treated may be introduced and removed. Any suitable cover can be provided for the opening 13 as will be readily understood. For the purpose of heating the furnace, electrical heating elements 14 are preferably arranged along opposite side walls thereof and by means of any conventional indicating and control mechanism, the temperature of the furnace can be regulated to heat the glass sheets to the required temperature. Preferably arranged in front of the heating elements 14 are baffle plates 15 which provide therebetween a chamber 16 for receiving the glass sheets 10. It is also preferred that the glass sheets be positioned within the furnace in such a manner that the heating elements are opposite the edges of the sheets thereby greatly increasing the glass capacity of the furnace as well as effecting a more uniform heating of said sheets.

When the glass sheets 10 have been heated to the desired temperature within the furnace, they are lifted therefrom through the top opening 13 into the position shown in full lines in Fig. 1 and, while in such position, they are adapted to be acted upon first by the bending means B and subsequently by the cooling means C to effect the simultaneous bending and tempering thereof. The bending means B comprises a plurality of pairs of bending members; one pair being provided for each glass sheet and including a convex mold member 17 and a concave mold member 18 positioned at opposite sides of said sheet and having convex and concave bending surfaces 19 and 20 respectively.

The mold members 17 and 18 are mounted upon a carriage 21 provided at its opposite ends with wheels 22 and 23 which are supported upon and run along tracks 24 and 25 respectively at opposite sides of the furnace A. The carriage 21 may be moved along tracks 24 and 25 to bring the bending molds into or out of operative association with the glass sheets 10 by any suitable means such as plungers 26—26 operating in cylinders 27—27.

The mold members 17 and 18 are also movable transversely in opposite directions upon the carriage 21 to effect the bending of the glass sheets 10 therebetween. To this end, the carriage is provided with a rectangular opening 28 along the opposite sides of which are formed undercut channels 29 and 30 within which are slidably received the beveled tongues 31 and 32 formed on each mold member. In operation, the convex mold members 17 are adapted to be moved in unison in one direction, while the concave mold members 18 are movable as a unit in the opposite direction. In order to effect the desired movement of said mold members, the convex mold members 17 are secured to a horizontal transverse rod 33 which passes therethrough, while the concave mold members 18 are carried by a similar transverse rod 34; said rods 33 and 34 being parallel with one another and operating within cylinders 35 and 36 respectively mounted at opposite ends of the carriage 21. As best illustrated in Fig. 1, the rod 33 passes through ears 37 formed on the mold members 17, while the rod 34 passes through ears 38 on mold members 18. The mold members 17 are provided at their lower edges with notches 39 for the rods 34 and similar notches are provided in the mold members 18 for the rod 33.

Figure 2:
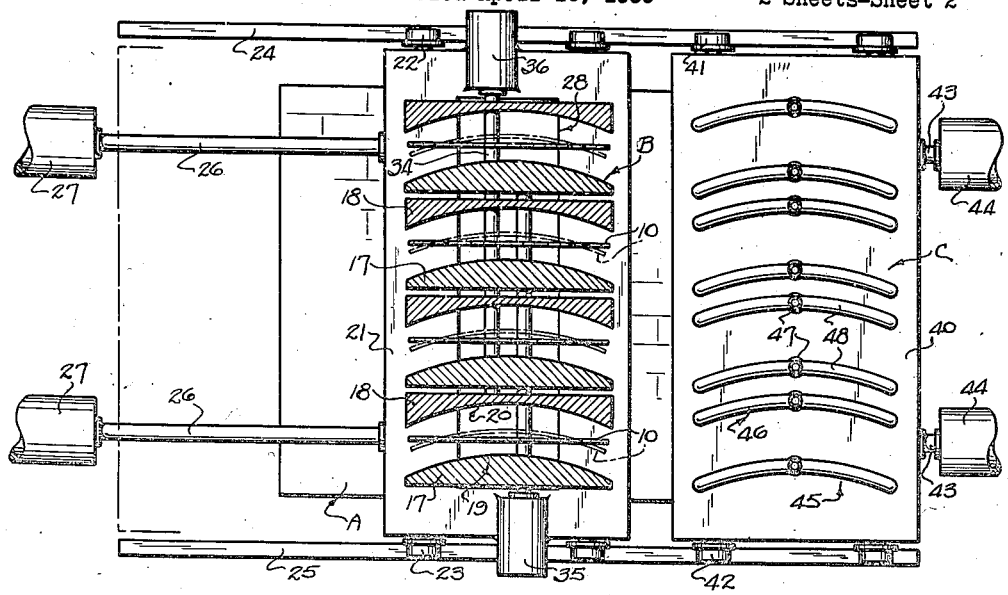
Fig. 2 is a horizontal section through the bending and cooling means taken substantially on line 2—2 of Fig. 1, with the bending members positioned between the glass sheets.

After the glass sheets 10 have been heated and lifted from the furnace into position between the bending and cooling means, the plungers 26—26 are operated to move the carriage 21 along tracks 24 and 25 to bring the mold members into place between the glass sheets as shown in Fig. 2. At this time, the mold members 17 and 18 of each pair will of course be spaced from one another to receive a sheet therebetween and a convex mold member will be arranged at one side of each sheet and a concave mold member at the opposite side thereof. When the bending means is thus properly positioned, the cylinders 35 and 36 are operated to force the rods 33 and 34 outwardly whereupon the convex and concave mold members will be simultaneously moved in unison in opposite directions, with each pair of mold members clamping one of the glass sheets therebetween and effecting the bending thereof to a predetermined curvature. After the glass sheets have been bent, as indicated by the broken lines in Fig. 2, the mold members are moved out of contact with the sheets and the carriage 21 then withdrawn to inoperative position.

The cooling means C also comprises a carriage 40 mounted upon wheels 41 and 42 which run along the tracks 24 and 25 respectively. The carriage 40 is actuated by plungers 43—43 which operate within cylinders 44—44. Mounted upon the carriage 40 are a plurality of pairs of blower heads 45 and 46, each comprising a vertical supporting pipe 47, mounted upon carriage 40, and a plurality of superimposed horizontal pipes 48. The supporting pipe 47 of each blower head is connected with suitable blowing apparatus through a flexible conduit 49 and the said pipe 47 is also in communication with the horizontal pipes 48. The horizontal pipes 48 of the blower heads 45 and 46 are bent longitudinally to conform substantially to the curvature given the glass sheets, as clearly shown in Fig. 2. These pipes are also provided with a series of perforations facing in the direction of the glass sheets and through which jets or blasts of air are directed simultaneously upon opposite surfaces of the sheets when said blower heads are brought into position at opposite sides thereof.

After the glass sheets have been bent and the blowing means B removed, the carriage 40 is moved along tracks 24 and 25 to bring the blower heads 45 and 46 into position at opposite sides of the bent sheets of glass whereupon they are operated to effect the sudden cooling or chilling thereof to complete the tempering operation.

From the above, it will be seen that after the glass sheets have been lifted from the furnace, they are maintained in the same position during the bending and cooling operation so that the liability of the glass surfaces becoming warped or distorted during treatment is greatly lessened. Also, danger of breakage of the glass or other injury thereto is materially diminished by rendering unnecessary the shifting of the position of the highly heated sheets during or between the bending and cooling operations. The heating of the glass sheets preparatory to the bending thereof likewise effects the heating of the glass to the desired temperature for cooling, so that only a single heating operation is necessary.

Although the bending means B herein provided has been designed especially for use in conjunction with the cooling means C for making bent, tempered sheets of glass, yet said bending means may, if desired, be used independently of said cooling means. In such case, the glass sheets, after being bent to the desired curvature, could be subjected to a slow and gradual cooling within a suitable annealing lehr.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. Apparatus for bending glass sheets, comprising means for supporting a plurality of sheets side by side in a vertical position and in spaced parallel relation, a plurality of pairs of convex and concave mold members, one pair being provided for each sheet and adapted to receive the respective sheet therebetween, means for connecting said convex mold members together in fixed spaced relation to one another, means for connecting said concave mold members in fixed spaced relation to one another, said convex and concave mold members being arranged alternately with one another, means for moving the said convex mold members in unison in one direction, and means for moving the said concave mold members as a unit in the opposite direction to effect the simultaneous bending of said sheets therebetween.

2. Apparatus for bending glass sheets, comprising means for supporting a plurality of sheets side by side in a vertical position and in spaced parallel relation, a horizontally movable carriage, a plurality of pairs of convex and concave mold members slidably mounted upon said carriage, one pair being provided for each sheet, means for moving said carriage to position said bending members between the glass sheets, means for connecting said convex mold members together in fixed spaced relation to one another, means for connecting said concave mold members in fixed spaced relation to one another, means for moving the said convex mold members in unison upon the carriage in one direction, and means for moving the said concave mold members as a unit upon the carriage in the opposite direction to effect the simultaneous bending of said sheets therebetween.

3. Apparatus for the manufacture of bent tempered sheets of glass, comprising means for supporting a plurality of sheets, heated to a temperature approximating the softening point of the glass, side by side in a vertical position and in spaced parallel relation, horizontal tracks extending parallel with said sheets, a carriage movable upon said tracks, a plurality of pairs of convex and concave mold members carried by said carriage, one pair being provided for each sheet, a second carriage movable upon said tracks, a plurality of pairs of blower heads carried by said second carriage, one pair being provided for each sheet, means for moving said first-mentioned carriage along said tracks to bring said bending molds into operative position at opposite sides of said sheets to effect the bending operation and for withdrawing them therefrom after bending, and means for moving said second-mentioned carriage along said tracks to bring said blower heads into the position at opposite sides of the said sheets vacated by the said bending molds to effect the cooling operation.

4. Apparatus for bending glass sheets, comprising means for supporting a plurality of sheets side by side in a vertical position and in spaced parallel relation, a horizontally movable carriage, a plurality of pairs of convex and concave mold members slidably mounted upon said carriage, one pair being provided for each sheet, a horizontal rod extending transversely of said mold members and upon which said convex mold members are secured in fixed spaced relation to one another, a second horizontal rod also extending transversely of said mold members and upon which said concave mold members are secured in fixed spaced relation to one another, means mounted upon said carriage for moving said first-named rod axially to move the said convex mold members in unison in one direction, and means mounted upon said carriage for moving said second-named rod axially to move the said concave mold members as a unit in the opposite direction to effect simultaneous bending of the said sheets between the said convex and concave mold members.

GERALD WHITE.